(12) United States Patent
Dolak et al.

(10) Patent No.: US 6,971,227 B2
(45) Date of Patent: Dec. 6, 2005

(54) SYSTEM AND METHOD TO STAGE PRIMARY ZONE AIRFLOW

(75) Inventors: Eric Dolak, Newmarket, NH (US); Jeffrey Armstrong, Exeter, NH (US)

(73) Assignee: Ingersoll Rand Energy Systems, Inc., Portsmouth, NH (US)

( * ) Notice: Subject to any disclaimer, the term of this patent is extended or adjusted under 35 U.S.C. 154(b) by 127 days.

(21) Appl. No.: 10/417,016

(22) Filed: Apr. 16, 2003

(65) Prior Publication Data

US 2004/0206088 A1 Oct. 21, 2004

(51) Int. Cl.$^7$ ................................................. F02C 7/10
(52) U.S. Cl. ...................................... 60/39.511; 60/737
(58) Field of Search ........................ 60/39.511, 39.872, 60/737, 752

(56) References Cited

U.S. PATENT DOCUMENTS

| | | | |
|---|---|---|---|
| 3,584,459 A | 6/1971 | Amann | |
| 3,630,022 A | 12/1971 | Jubb | |
| 3,705,492 A | 12/1972 | Vickers | |
| 3,717,994 A | 2/1973 | Templin | |
| 3,742,702 A | 7/1973 | Quinn | |
| 3,893,292 A | 7/1975 | Amann et al. | |
| 3,986,347 A | 10/1976 | Schirmer | |
| 4,078,377 A | 3/1978 | Owens et al. | |
| 4,081,958 A | * 4/1978 | Schelp | 60/39.511 |
| 4,229,257 A | 10/1980 | Forster | |
| 4,255,122 A | 3/1981 | Alpkvist et al. | |
| 4,375,745 A | 3/1983 | Schelp | |
| 5,156,002 A | 10/1992 | Mowill | |
| 5,193,337 A | 3/1993 | Harboe et al. | |
| 5,477,671 A | 12/1995 | Mowill | |
| 5,481,866 A | 1/1996 | Mowill | |
| 5,613,357 A | 3/1997 | Mowill | |
| 5,638,674 A | 6/1997 | Mowill | |
| 5,924,276 A | 7/1999 | Mowill | |
| 6,223,537 B1 | * 5/2001 | Lipinski et al. | 60/737 |
| 2002/0104316 A1 | 8/2002 | Dickey et al. | |
| 2002/0139119 A1 | 10/2002 | Touchton et al. | |

FOREIGN PATENT DOCUMENTS

| EP | 0014075 | 1/1980 |
|---|---|---|

* cited by examiner

*Primary Examiner*—Louis J. Casaregola
(74) *Attorney, Agent, or Firm*—Michael Best & Friedrich, LLP

(57) ABSTRACT

A combustion air delivery system comprising a compressor operable to provide a stream of compressed air and a bypass duct positioned to divide the stream of compressed air into a bypass flow stream and a primary flow stream. A recuperator is operable to preheat the primary flow to produce a flow of preheated compressed air. A premix chamber receives the bypass flow stream and mixes the bypass flow stream with a flow of fuel to produce a fuel-air flow. A can member at least partially defines a primary zone that receives the fuel-air flow and includes an aperture sized to admit a predetermined portion of the flow of preheated compressed air. The fuel-air flow and predetermined portion of the flow of preheated compressed air mix in the primary zone to produce a combustible flow. An igniter is operable to ignite the combustible flow.

13 Claims, 7 Drawing Sheets

SYSTEM AND METHOD TO STAGE PRIMARY ZONE AIRFLOW

BACKGROUND OF THE INVENTION

The present invention relates to a system and apparatus for optimizing airflow to a combustor and particularly to a system and method for controlling airflow to the combustor. More particularly, the present invention relates to a system and method for controlling the quantity of airflow to the primary zone of the combustor.

Present combustors are typically designed for a specific fuel to be combusted. Each fuel requires a specific fuel-to-air ratio (FAR) to be combusted efficiently without producing excessive undesirable emissions (e.g., $NO_x$, CO, and unburned hydrocarbons). Thus, a combustor that operates well using natural gas may not be efficient or may produce undesirable emissions when operated using a different fuel such as butane. At present, fuel-staging is used to allow one combustor design to operate with multiple fuels. However, fuel-staging increases unwanted emissions when operating at part power.

SUMMARY OF THE PREFERRED EMBODIMENTS

The present invention provides a combustion turbine engine adapted for use with a source of fuel. The engine includes a compressor operable to produce a flow of compressed air, a recuperator, and a bypass duct extending around said recuperator. A flow divider selectively divides the flow of compressed air into a first flow of compressed air flowing through said recuperator and a second flow of compressed air flowing through said bypass duct around said recuperator. The first flow of compressed air is preheated within said recuperator. An adjustable valve operably interacts with at least one of said first and second flows of compressed air to selectively adjust the flow rate of the same. A premix chamber is adapted to receive a flow of fuel from the source of fuel. The premix chamber communicates with said bypass duct to receive said second flow of compressed air and to mix said flow of fuel and said second flow of compressed air into a premixture. The invention also includes a combustor having a primary zone in communication with both of said premix chamber and said recuperator such that said preheated first flow of compressed air from said recuperator and said premixture from said premix chamber are mixed within said primary zone to create a combustible mixture. The combustor combusts said combustible mixture to produce a flow of products of combustion. The invention further includes a power turbine driven by the flow of products of combustion from said combustor and a power generator generating power in response to operation of said power turbine, wherein the flow of products of combustion flows through said recuperator to preheat said first flow of compressed air.

In another embodiment, the invention provides a combustion air delivery system comprising a compressor operable to provide a stream of compressed air and a bypass duct positioned to divide the stream of compressed air into a bypass flow stream and a primary flow stream. A recuperator is operable to preheat the primary flow to produce a flow of preheated compressed air. A premix chamber receives the bypass flow stream and mixes the bypass flow stream with a flow of fuel to produce a fuel-air flow. A can member at least partially defines a primary zone that receives the fuel-air flow and includes an aperture sized to admit a predetermined portion of the flow of preheated compressed air. The fuel-air flow and predetermined portion of the flow of preheated compressed air mix in the primary zone to produce a combustible flow. An igniter is operable to ignite the combustible flow.

In yet another embodiment, the invention provides a method of operating a combustion turbine engine. The method includes separating a flow of compressed air into a first flow stream and a second flow stream and preheating the first flow stream to produce a preheated flow stream. The method also includes premixing the second flow stream with a flow of fuel to produce a premixture. The invention further includes mixing the premixture with a portion of the preheated first flow stream to produce a combustible mixture and combusting the combustible mixture to produce a flow of hot products of combustion.

Additional features and advantages will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
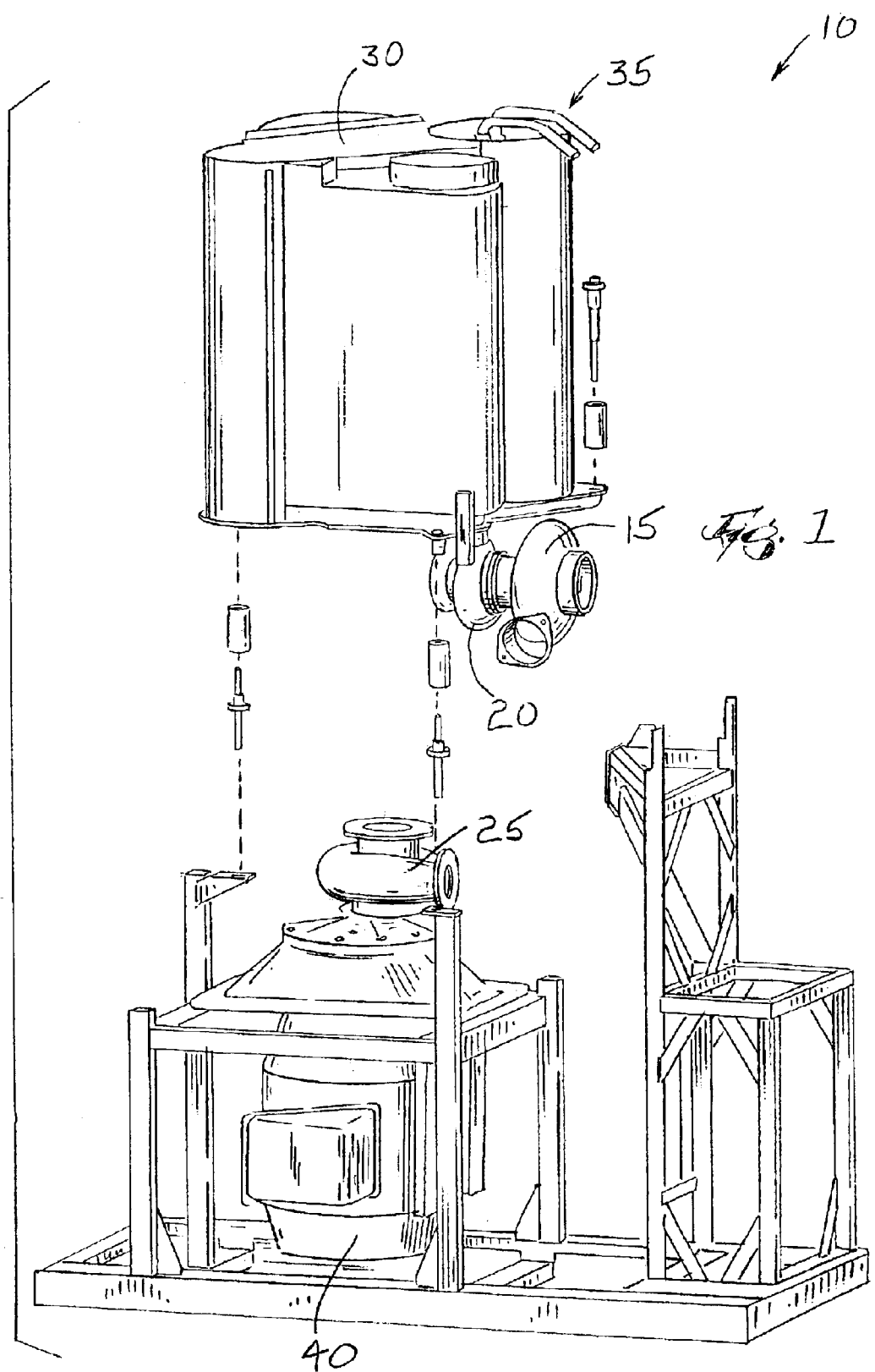
FIG. 1 is a perspective view of a combustion turbine engine.

With reference to FIG. 1, a combustion turbine engine 10 is illustrated as including a compressor 15, a gasifier turbine 20, a power turbine 25, a recuperator 30, a combustion section 35 including a combustor 37 (FIGS. 2, 3, and 5), and various air passages. In addition, the engine 10 generally includes a driven element such as a generator 40. In a two-turbine engine 10 such as the one illustrated in FIG. 1, the gasifier turbine 20 is connected to the compressor 15 such that operation of the gasifier turbine 20 drives the compressor 15. The power turbine 25 is connected to the generator 40 or another component to be driven (e.g., a pump) such that operation of the power turbine 25 drives the generator 40. In a one-turbine engine 10, the single turbine would be sized to drive both the compressor 15 and the generator 40.

Figure 2:
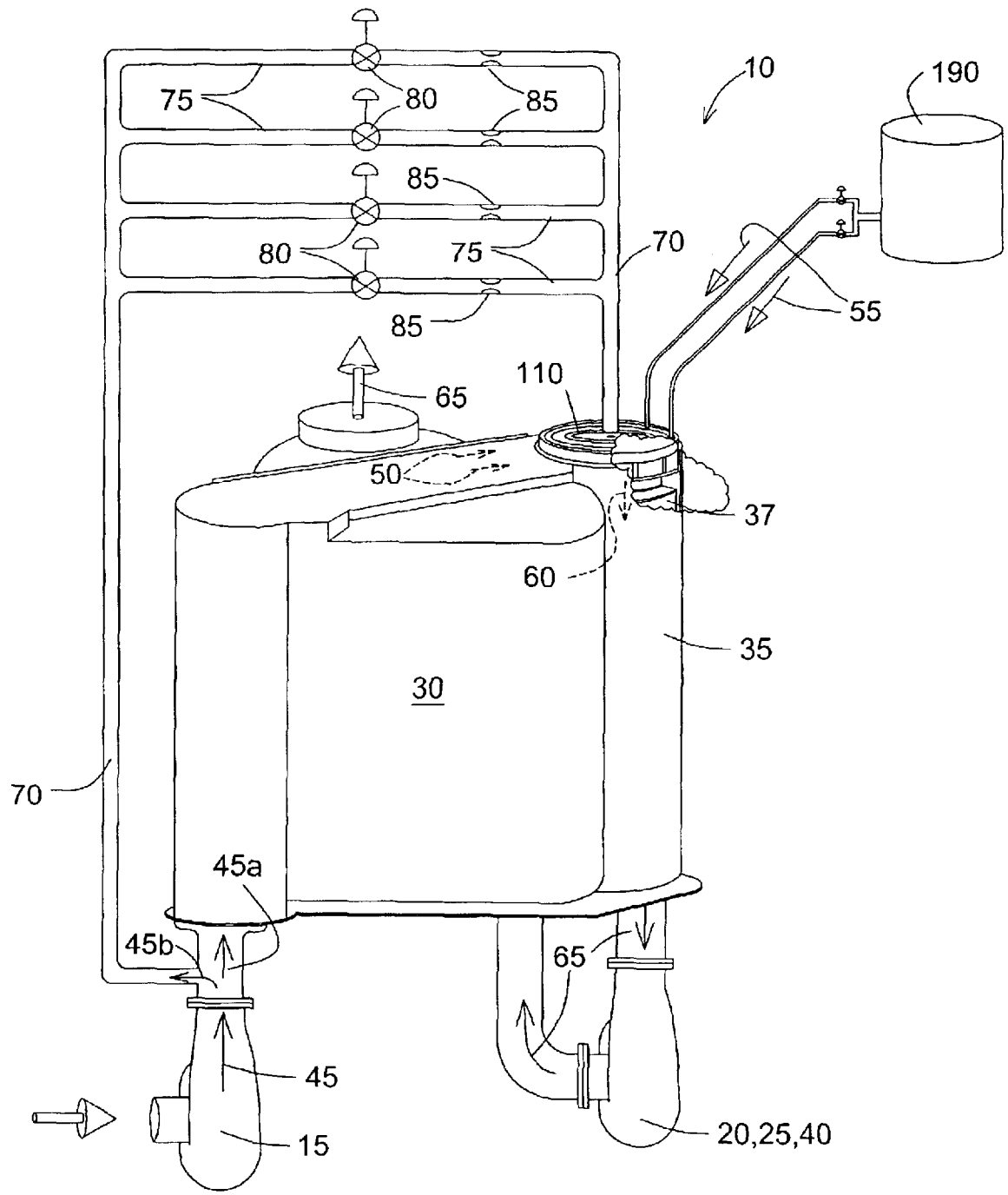
FIG. 2 is a schematic illustration of a combustion system embodying the present invention and including a combustion section.
Figure 3:
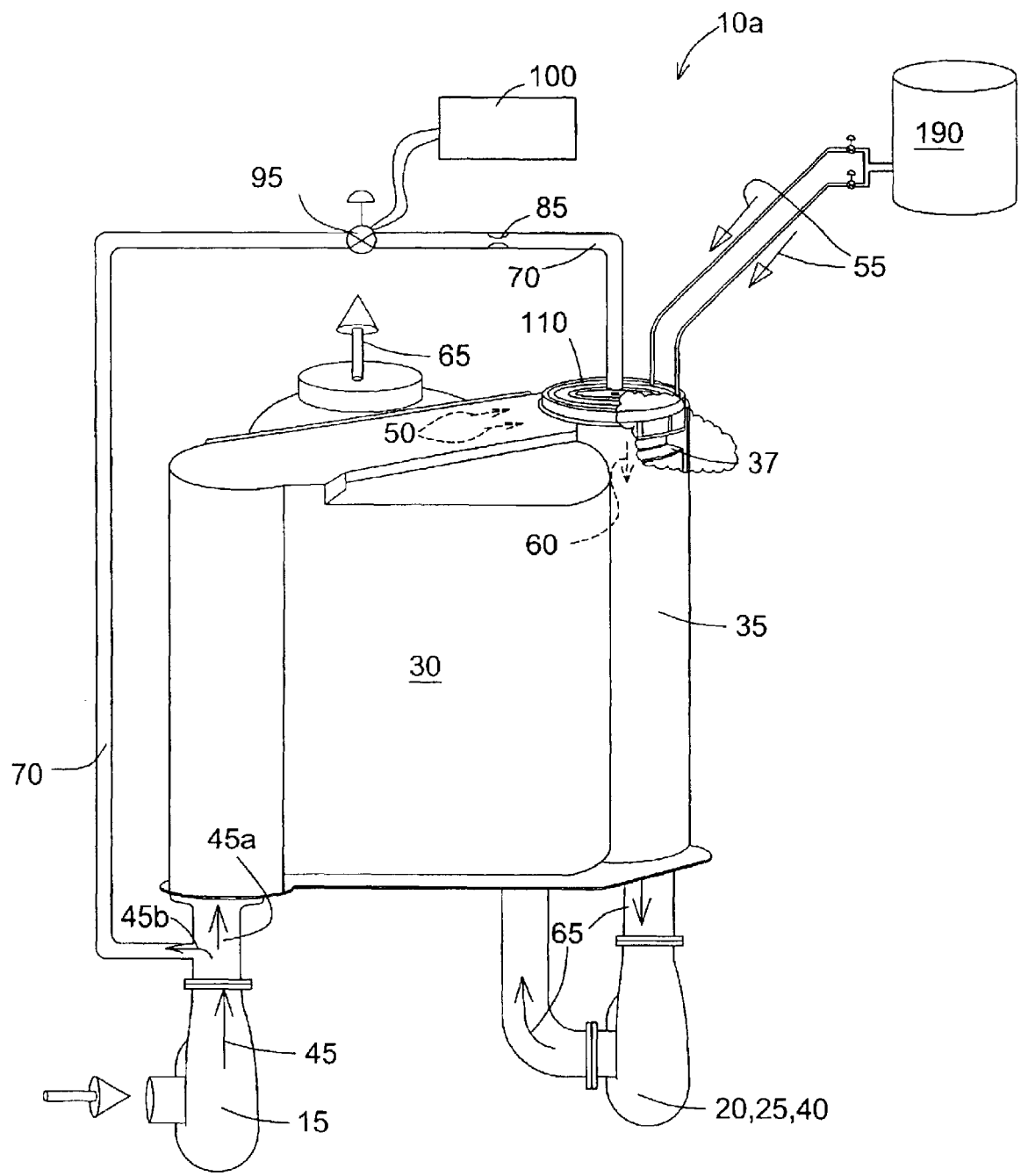
FIG. 3 is a schematic illustration of another combustion system embodying the present invention.

During engine operation, atmospheric air is drawn into the compressor 15 and compressed to produce a flow of compressed air 45 (shown in FIGS. 2 and 3). A portion of the flow of compressed air 45 flows through the recuperator 30 where it is preheated. The preheated compressed air 50 enters the combustion section 35 and combines with a flow of fuel 55 to produce a combustible fuel-air mixture 60 (shown in FIGS. 2, 3, and 5). The fuel-air mixture 60 is combusted to produce an expanding flow of combustion gas or products of combustion 65. The flow of combustion gas 65 passes through the gasifier turbine 20 to power the gasifier turbine 20 and drive the compressor 15. The flow of combustion gas 65 then flows through the power turbine 25 to drive the generator 40. The flow of combustion gas 65 proceeds through the recuperator 30 and preheats the flow of compressed air 45a exiting the compressor 15 before being discharged to the atmosphere. In some constructions, the flow of combustion gas 65 leaving the recuperator 30 is used in another process before being discharged (e.g., heating water).

Turning to FIG. 2, the engine air passages are illustrated in more detail. Before describing the passages, it should be noted that various terms such as "passage," "duct," "pipe," and "flow path," among others, are used herein to describe devices suited to conducting fluids from one point to another. These terms should be considered interchangeable and should not be read to limit the invention in any way. For example, and without limiting the foregoing, the term "pipe" should be interpreted broadly to include "duct," "tube," "plenum," and "flow path" among other terms.

The flow of compressed air 45 exits the compressor 15 and is divided into two distinct flow streams. The first flow stream 45a enters the recuperator 30 and is preheated as described above. The preheated compressed air 50 then flows to the combustion section 35. The second flow stream 45b, or bypass flow stream, enters a bypass duct 70 that directs the bypass flow stream 45b around the recuperator 30 and into the combustion section 35 without preheating the air.

Figure 4:
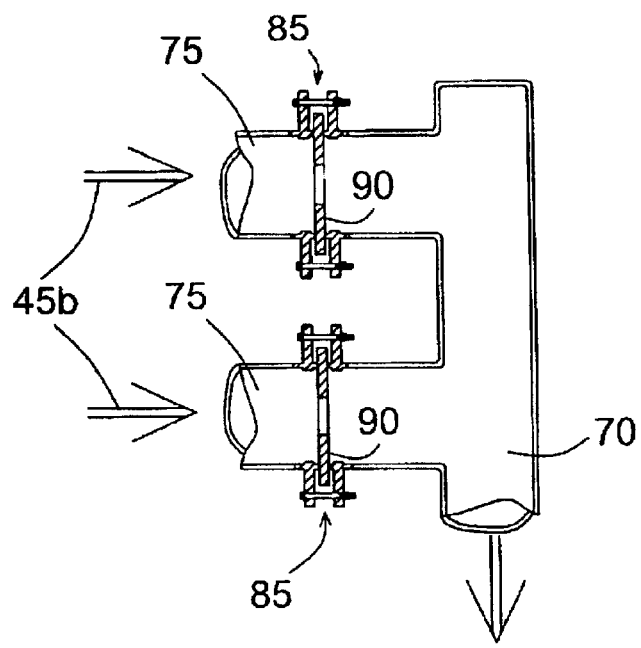
FIG. 4 is an enlarged view of an orifice plate.

The second flow stream 45b is further divided into a plurality of flow paths 75. Each of the plurality of flow paths 75 include a valve 80 that can control the flow through the individual flow path 75 and an orifice 85 that limits the amount of flow to a predetermined rate. In some constructions, the valve 80 itself acts as the orifice 85 by limiting the amount of flow even when fully opened. In other constructions, orifice plates 90 (shown in FIG. 4) are positioned in each of the flow paths 75. The use of the orifice plates 90 allows for precise control of the mass flow rate through each of the flow paths 75 under given operating conditions. In addition, the orifice plates 90 can be changed to increase or decrease the flow capacity of a particular flow path 75 if desired. It should be understood that even a pipe with no flow obstructions could be considered "orificed," as the size or diameter of the pipe limits flow under any given operating condition. As such, the invention should not be limited to arrangements that require orifice plates 90 or other components that act as orifices 85. Rather, the orifices 85 are used to increase the accuracy and predictability of engine performance.

The use of multiple flow paths 75 allows for more refined control when compared to a single-path system, as one or more valves 80 can be partially or totally opened to allow the desired amount of air to bypass the recuperator 30. In most constructions, each valve 80 is set to either an open position or a closed position to reduce the likelihood of air leakage at the valve 80. Thus, the use of multiple valves 80 and multiple flow streams 75 allows for adequate control over the quantity of air being bypassed without the use of a complex control scheme or expensive valve.

Turning now to FIG. 3, a second construction of the engine 10a is illustrated in which the second flow stream 45b is not divided into a plurality of flow paths 75. Rather, the engine 10a includes a single flow path 45b having a controllable multi-position valve 95. A controller 100 adjusts the valve 95 as needed based on one or more control parameters (e.g., turbine temperature, exhaust temperature, turbine inlet temperature, turbine exhaust composition, combustor pressure, fuel type, power level, operating temperature, ambient air temperature, etc.). In some constructions, the valve position is preset and is not adjusted during operation. For example, a particular engine that is capable of operating on several different fuels (e.g., natural gas, propane, butane, JP-8, etc.) operates most efficiently if the combustor 37 is specifically configured for the particular fuel being burned. A switch (not shown), operated by the user, repositions the controllable valve 95 to a fuel-specific position before operation of the engine 10a. Thus, the engine 10a operates efficiently with any of the fuels. In another construction, the valve 95 is controlled during engine operation by the controller 100. One or more engine parameters are used to periodically or constantly adjust the position of the valve 95 to achieve the desired performance. As one of ordinary skill in the art will realize, many different control parameters and control systems could be used to control the valve position.

A person of ordinary skill will also realize that the controller 100 and system as just described with regard to FIG. 3 could be applied to the engine 10 of FIG. 2 to achieve similar results. Thus, the use of controllable valves 95 should not be limited to constructions similar to that of FIG. 3 alone. Furthermore, the valve 95 of FIG. 3 could be manually controlled to achieve the desired results. In these constructions, the valve 95 is positioned in predetermined positions based on various factors (e.g., turbine temperature, exhaust temperature, turbine inlet temperature, turbine exhaust composition, combustor pressure, fuel type, power level, operating temperature, ambient air temperature, etc.).

Figure 5:
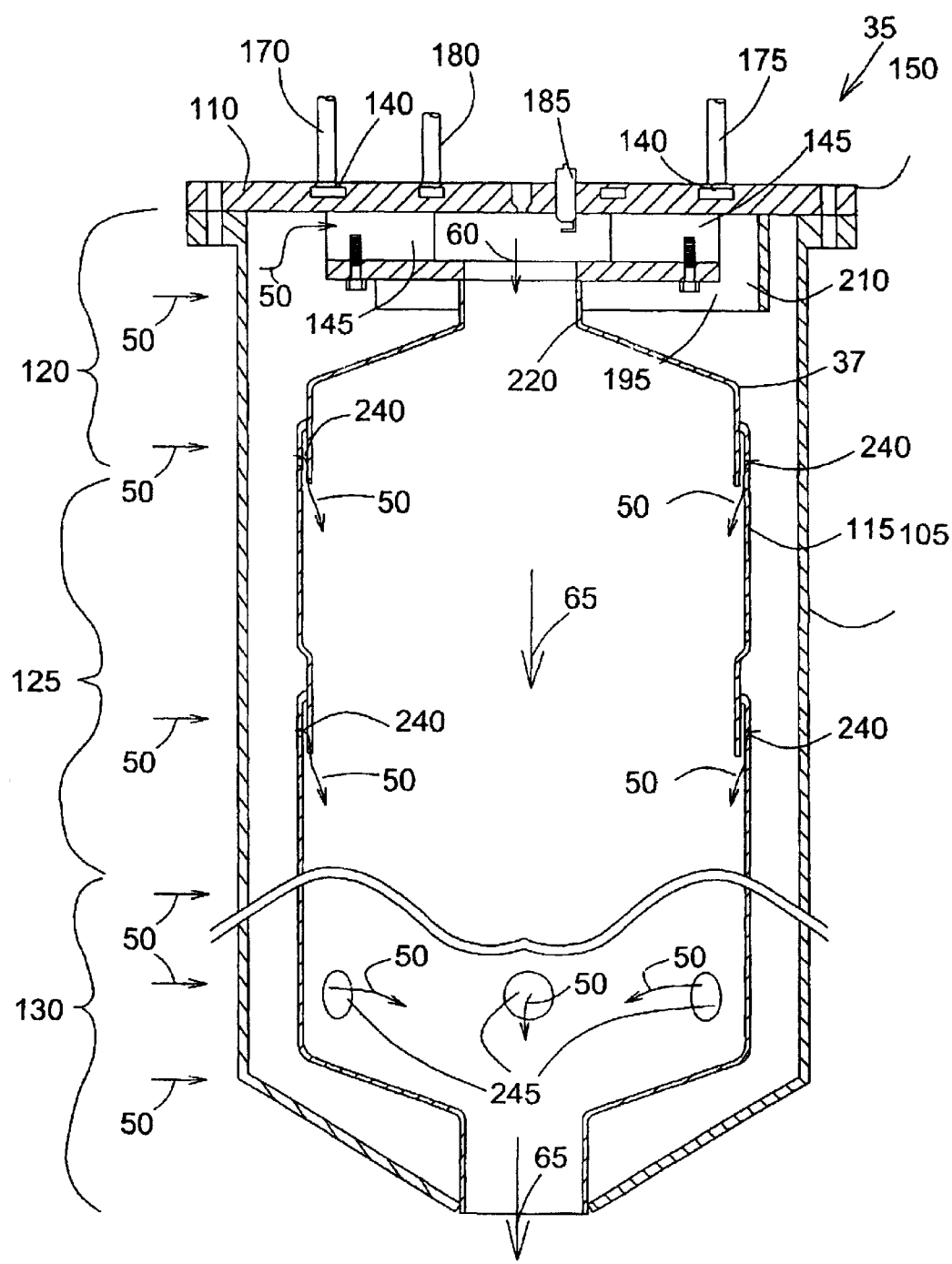
FIG. 5 is a cross-sectional view of the combustion section of FIG. 2 and including a swirler head.

FIG. 5 shows a sectional view of a can-type combustor. As seen in FIG. 5, the combustor 37 is positioned within an outer wall 105. In most constructions, the outer wall 105 is formed as part of the recuperator 30 as shown in FIGS. 2 and 3. This arrangement reduces the space occupied by the engine 10 and reduces the number of components such as pipes, flanges, and valves needed to assemble the engine 10. Other constructions may employ a combustion section 35 spaced some distance from the recuperator 30 and use pipes or other ducts to direct the preheated compressed air 50 from the recuperator to the combustion section 35 and from the combustion section 35 to the turbine 20.

The combustor 37, illustrated in FIG. 5 includes a swirler head 110 attached to a can 115 and positioned substantially within the outer wall 105 defined by the recuperator 30. The combustor 37 is generally divided into zones including a primary zone 120 and a secondary zone 125, with many constructions also including a tertiary or dilution zone 130. In general, combustion is initiated and maintained within the primary zone 120. Additional air may be added in the secondary zone 125 to assure complete combustion and reduce the quantity of undesirable emissions. The tertiary or dilution zone 130, if employed, receives a large quantity of air to cool the flow of combustion gas 65 to a desired combustor outlet temperature before the flow of combustion gas 65 enters the turbine 20.

The primary zone 120 is defined by a portion of the swirler head 110 and a portion of the combustor can 115. The swirler head 110, best illustrated in FIGS. 6 and 7, includes a body 135 that defines a premix chamber 140 (shown broken away in FIG. 6 and in cross-section in FIG. 5) and a plurality of flow guides 145. The body 135 also includes a flange 150 that facilitates the attachment of the combustor 37 to the recuperator 30. The flange 150 separates the swirler head 110 into an outer portion 155, illustrated in FIG. 6, and an inner portion 160 illustrated in FIG. 7. The inner portion 160 is substantially within the primary zone 120 of the combustor 37, while the outer portion 155 is not. As illustrated herein, the swirler head 110 is a separate component that attaches to the can 115. However, other constructions employ a swirler head 110 that is formed as part of the can 115. In still other constructions, the swirler head 110 is a separate component positioned away from the remainder of the combustion section 35.

Figure 6:
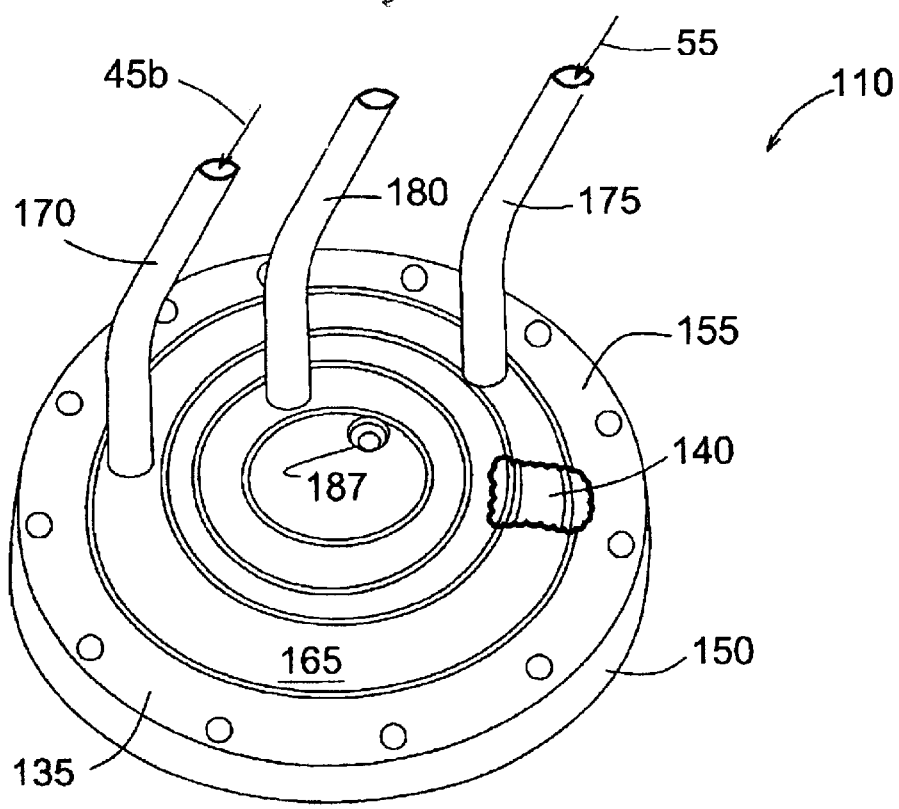
FIG. 6 is a partially broken away perspective view of the swirler head of FIG. 5.

The premix chamber 140 is an annular chamber within the body 135 of the swirler head 110. As shown in FIG. 6, a bypass air inlet 170 and a fuel inlet 175 both attach to the outer surface of the cover plate 165 and/or the body 135 of the swirler head 110 to deliver bypass air and fuel to the combustor 37.

Also visible on the outer portion 155 of the swirler head 110 is a pilot fuel inlet 180 and an ignitor 185 that is received in a hole 187 in the head 110. The pilot fuel inlet 180 provides a separate flow of fuel that may be used to maintain the flame stability within the combustor 37 at low power settings or to initiate combustion within the combustor 37 during an engine start. The igniter 185 is a spark-producing device that provides a spark to initiate combustion during engine start-up or at any other time when the flame is desired but not present. Alternatively, a heat-producing device such as a glow plug is used. As one of skill in the art will realize, many other devices are well suited to the task of initiating a flame and as such are contemplated by the present invention.

Both the fuel inlet 175 and the pilot fuel inlet 180 receive a flow of fuel 55 from an external fuel source 190 (FIGS. 2 and 3) such as a tank or gas line. In most constructions, a fuel pump/compressor and/or assorted valves are in fluid communication with the fuel source 190 and the swirler head 110 to control the rate of fuel flow. Thus, the engine 10 is able to deliver fuel at a desired rate to the combustor 37.

Figure 7:
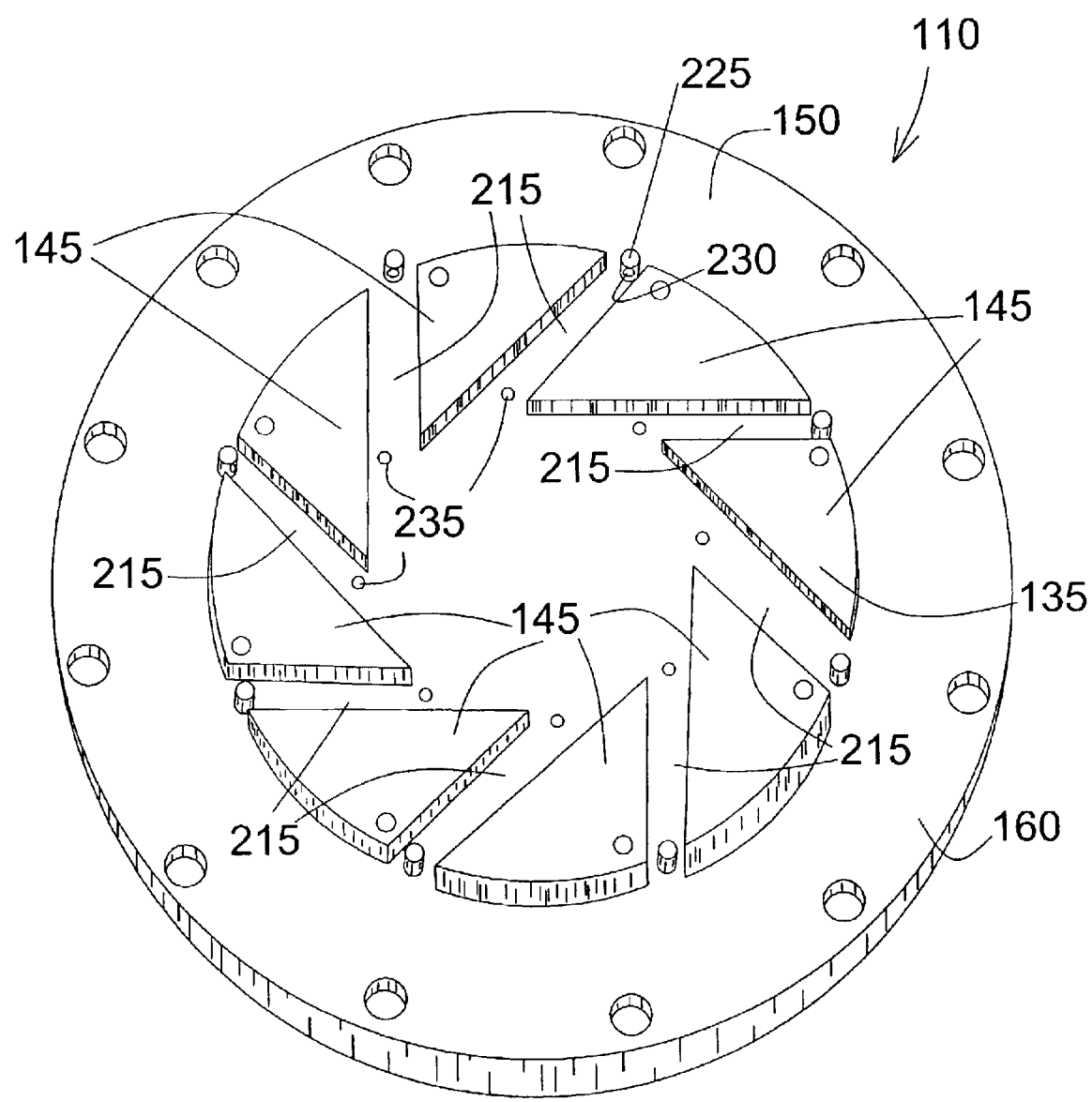
FIG. 7 is another perspective view of the swirler head of FIG. 6.
Figure 8:
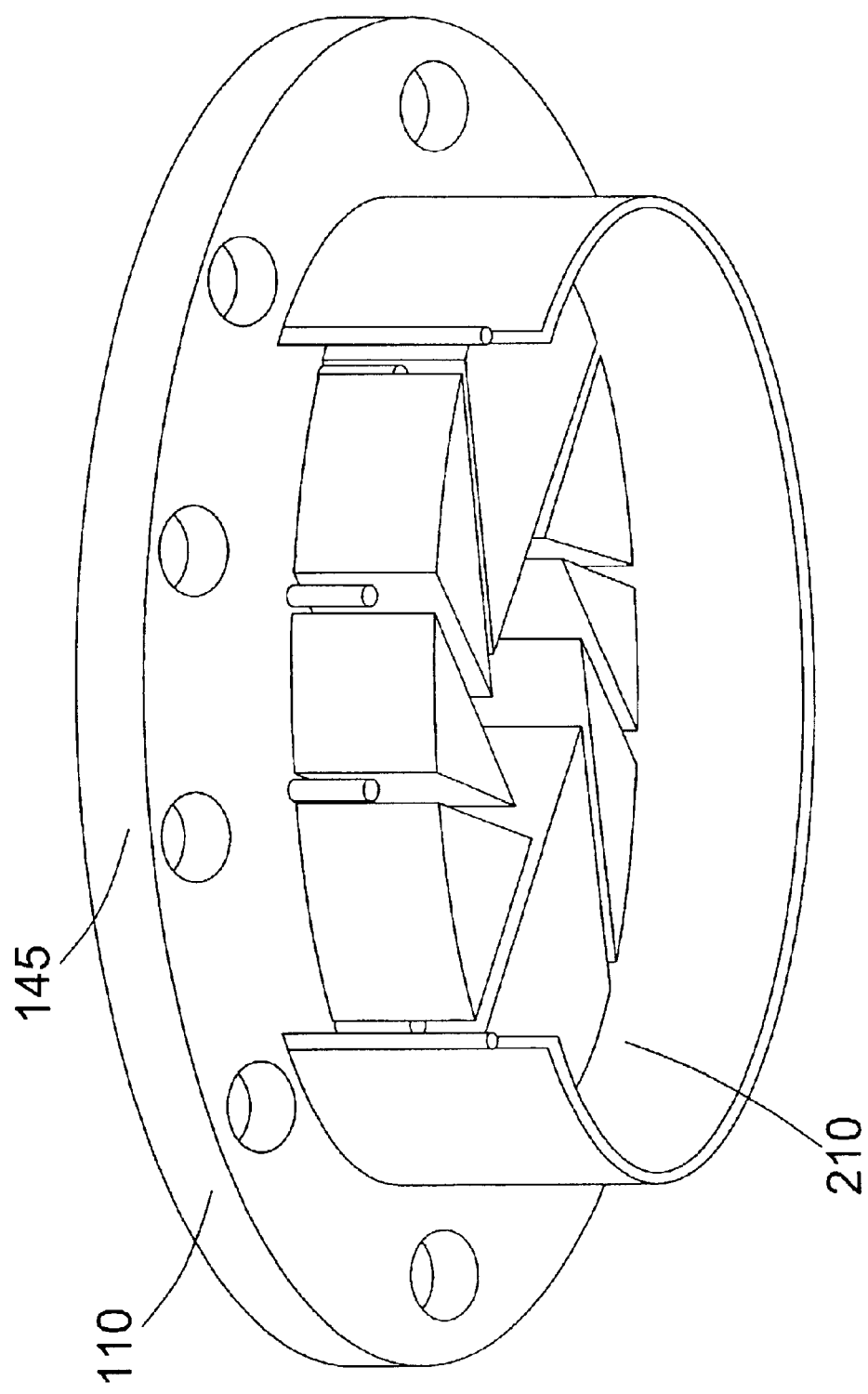
FIG. 8 is a perspective view of the swirler head of FIG. 6 with a skirt attached.

In one construction of a swirler head 110 shown in FIG. 7, the inner portion 160 includes the plurality of flow guides 145 that are partially encircled by a skirt 195 (shown in FIGS. 5 and 8). The flow guides 145 are generally raised triangular blocks having two planar surfaces 200 and an arcuate outer surface 205. The outer surfaces 205 and the skirt 195 cooperate to define a partial annular air chamber 210. The planar surfaces 200 of each flow guide 145 are arranged such that they are substantially parallel to the planar surfaces 200 of the adjacent flow guides 145. Using this arrangement, a plurality of flow paths 215, or apertures, are defined between the annular air chamber 210 and a primary zone neck 220 (FIG. 5). The skirt 195 guides compressed air exiting the recuperator 30 into the flow paths 215. As one of ordinary skill will realize, many different arrangements are possible to direct compressed air into the primary zone 120. As such, the present invention should not be limited to the aforementioned example.

Within each flow path 215 are two fuel inlets. The first of the inlets 225 is located adjacent the flow path inlets and includes an injector 230 that directs the fuel flow in the flow direction of the compressed air. The first fuel inlet 225 is in fluid communication with, and receives a flow of fuel or fuel-air from the premix chamber 140. The second fuel inlet 235 comprises a small bore located adjacent the individual flow path outlets. This inlet 235 is in fluid communication with the pilot fuel inlet 180.

The primary zone neck 220 is a substantially cylindrical region of the can 115 that defines a portion of the primary zone 120 of the combustor 37. The flow paths 215 defined by the flow guides 145 direct the compressed air from the annular air chamber 210 into the primary zone neck 220. The igniter 185 (shown in FIG. 5) is positioned within the primary zone 120 to enable it to ignite the fuel-air mixture therewithin. Alternatively, the igniter 185 could be positioned elsewhere in the head 110 or neck 220.

The secondary zone 125 is positioned downstream of the primary zone 120 and includes additional apertures 240 that admit air. The apertures 240 direct compressed air along the inner wall of the can 115 in the secondary zone 125. In other constructions, additional apertures may be used to admit air to further sustain combustion.

The tertiary zone or dilution zone 130 is located downstream of the secondary zone 125 and includes large apertures 245 that admit the remaining compressed air into the combustor as the air exits the recuperator 30. In other constructions, the flow of combustion gas 65 exits the can 115 and then mixes with the remaining compressed air before finally flowing to the turbine 20. In either construction, the remaining compressed air mixes with the flow of combustion gas 65.

In operation, the compressed air exits the compressor 15 and divides into the two flow streams 45a, 45b. The first flow stream 45a is directed to a plenum in the recuperator 30, then through the recuperator 30 where the air is preheated until finally reaching the air space between the recuperator 30 and the combustor 37. Meanwhile, the second flow stream (bypass air stream) 45b proceeds from the compressor 15 directly to the swirler head 110 without passing through the recuperator 30.

The bypass air enters the premix chamber 140 through the bypass air inlet 170. For engines configured as shown in FIG. 2, a plurality of air inlets 170 may be used. However, in other constructions the bypass air is recombined into a single flow before being admitted into the premix chamber 140. The premix chamber 140 for this construction would require only a single air inlet 170, thereby simplifying the manufacture of the swirler head 110. One of ordinary skill in the art will realize that the premix chamber 140 could be designed to have multiple air inlets 170 if desired, no matter the arrangement of the engine 10.

Within the premix chamber 140, the bypass air and the fuel mix to produce a fuel-air mixture. The fuel inlet(s) 175 and air inlet(s) 170 are arranged such that the air and fuel mix thoroughly within the premix chamber 140. The fuel/air ratio (FAR) of the mixture within the premix chamber 140 is typically too high (i.e., rich mixture) to sustain combustion. Thus, additional air must be added to the fuel-air mixture to initiate and sustain combustion. After mixing, the fuel-air mixture within the premix chamber 140 is injected into the primary zone 120 of the combustor 37 via the fuel inlets 225.

The flow paths 215 are sized to admit sufficient air into the primary zone 120 to sustain combustion at a desired or target equivalence ratio (ER). The ER is defined as the ratio of the actual FAR and the stoichiometric fuel-air ratio. The stoichiometric fuel-air ratio is the ideal ratio of a particular fuel and air for combustion. At the stoichiometric fuel-air ratio, all of the fuel and all of the oxygen are consumed during combustion.

In one construction, the target ER value is 0.5. Thus, the fuel-air mixture in the primary zone 120 is lean (i.e., excess oxygen is available for combustion). The lean mixture reduces the undesirable engine emissions during operation.

As an example, many combustion turbine engines 10 use natural gas as the primary fuel. Natural gas has a stoichiometric fuel-air ratio of 0.058 (i.e., for every kilogram of fuel, 17.25 kilograms of air are required). For a target equivalence ratio of 0.5 using natural gas, the actual FAR must be 0.029 (i.e., for every kilogram of fuel, 34.5 kilograms of air are supplied). A portion of the necessary air is supplied in the fuel-air mixture delivered from the premix chamber 140. As such, the flow paths 215 in the swirler head 110 are sized to admit the remaining air. For example, at one operating condition, air may be supplied to the premix chamber 140 at a fuel-air ratio of 0.10 (i.e., for every kilogram of fuel, ten kilograms of air are supplied). Thus, the flow paths 215 must be sized to admit the remaining 24.5 kilograms of air needed to reach the targeted ER.

During turndown (part load) operation, the mixture in the primary zone 120 tends to become more lean (excessive air). In some cases, the FAR can fall below the lean extinction FAR of the combustor 37, thereby causing blowout, flame extinction, or other flame related problems. The present invention allows for the maintenance of the target ER during turndown operation by reducing the air flow into the premix chamber 140. This has the desirable effect of reducing the total air in the primary zone 120 as the quantity of fuel is reduced.

In addition to improved turndown operation, the present invention facilitates the efficient and clean operation of a single combustor 37 using multiple fuels. Continuing the example from above, if the combustor 37 were switched from natural gas to another fuel such as butane, its performance would suffer. Butane has a stoichiometric fuel-air ratio of 0.067 (i.e., for every kilogram of butane, 14.9 kilograms of air are required). Thus, to operate at an ER of 0.5, 29.8 kilograms of air must be admitted to the primary zone for each kilogram of fuel.

The above-described combustor 37 includes flow paths 215 sized to admit 24.5 kilograms of compressed air for every kilogram of fuel. Thus, the ER would be 0.43 with the valves 80 and combustor 37 configured as above for natural gas (i.e., 10 kilograms of air being mixed with one kilogram of fuel in the premix chamber 140). This ER may be low enough to cause flame instability and other operational problems. To counteract this and return the combustor 37 to optimal performance, the flow rate of bypass air to the premix chamber 140 is reduced. To return the combustor 37 to an ER of 0.5, the actual FAR must be approximately 0.034. (i.e., for every kilogram of fuel, 29.8 kilograms of air are present). To achieve this, the valve or valves 80 are adjusted to allow the passage of 5.3 kilograms of air per kilogram of fuel, rather than the 10 kilograms passed when operating with natural gas as the fuel. The flow paths 215 remain fixed and admit the remainder of the required air (i.e., 24.5 kilograms per kilogram of fuel). As one skilled in the art will realize, the present system can be designed to operate efficiently with several different fuels rather than just the two described.

It should be noted that the above description is for exemplary purposes only. The invention should in no way be limited to mass flow rates similar to those described, as larger or smaller fuel and air flow rates, as well as different ERs and FARs may be desirable and would be achievable with the invention as described herein.

Although the invention has been described in detail with reference to certain preferred embodiments, variations and modifications exist within the scope and spirit of the invention as described and defined in the following claims.

What is claimed is:

1. A combustion air delivery system comprising:
   a compressor operable to provide a stream of compressed air;
   a bypass duct positioned to divide the stream of compressed air into a bypass flow stream and a primary flow stream;
   a recuperator operable to preheat the primary flow to produce a flow of preheated compressed air;
   a premix chamber receiving the bypass flow stream and mixing the bypass flow stream with a flow of fuel to produce a fuel-air flow;
   a can member at least partially defining a primary zone, the primary zone receiving the fuel-air flow and including an aperture sized to admit a predetermined portion of the flow of preheated compressed air, the fuel-air flow and predetermined portion of the flow of preheated compressed air mixing in the primary zone to produce a combustible flow; and
   an igniter operable to ignite the combustible flow.

2. The combustion air delivery system of claim 1, wherein the can at least partially defines a secondary zone that includes at least one aperture sized to admit at least a portion of the preheated compressed air.

3. The combustion air delivery system of claim 1, further comprising an orifice positioned in the bypass flow stream to limit a flow rate of the bypass flow stream.

4. The combustion air delivery system of claim 1, further comprising a valve member operable to control a flow rate of the bypass flow stream to the premix chamber.

5. The combustion air delivery system of claim 4, wherein the valve member is adjustable between a first position and a second position.

6. The combustion air delivery system of claim 4, wherein the valve member further includes a plurality of valves, each valve in fluid communication with the bypass flow stream and the premix chamber, each valve movable between an open and a closed position.

7. The combustion air delivery system of claim 6, wherein each valve is individually controllable.

8. The combustion air delivery system of claim 1, wherein the fuel-air mixture contains sufficient fuel to render the fuel-air mixture incombustible.

9. The combustion air delivery system of claim 1, wherein the fuel-air mixture includes a mass of bypass air delivered by the bypass flow stream, and wherein the mass of bypass air is mixed with the predetermined portion of the flow of preheated compressed air to produce a desired fuel-air ratio within the primary zone of the combustor.

10. The combustion air delivery system of claim 9, further comprising a valve member operable to vary a mass of bypass air in the fuel-air mixture.

11. The combustion turbine engine of claim 1, wherein the can member at least partially defines a can-type combustor.

12. The combustion air delivery system of claim 1, wherein said bypass duct includes a plurality of passages, the system further comprising an adjustable valve associated with at least one of said plurality of passages, said adjustable valve being adjustable to selectively control the flow of compressed air through the passage associated with the adjustable valve.

13. The combustion air delivery system of claim 12, further comprising a plurality of adjustable valves, each of the plurality of adjustable valves associated with one of the plurality of passages to control the flow of compressed air therethrough.

* * * * *